United States Patent [19]

Shames et al.

[11] 4,070,003
[45] Jan. 24, 1978

[54] COUPLER WITH AUTOMATIC SHUT-OFF

[75] Inventors: Sidney J. Shames, Briarclif Manor; Harold Shames, Ardlsey, both of N.Y.; John F. Logan, Pequannock, N.J.

[73] Assignees: Sidney J. Shames; Harold Shames, both of Passaic, N.J.

[21] Appl. No.: 706,390

[22] Filed: July 19, 1976

[51] Int. Cl.² .................. F16L 29/00; F16L 37/28
[52] U.S. Cl. .................. 251/149.6; 285/316
[58] Field of Search ............ 251/149, 149.1, 149.2, 251/149.3, 149.4, 149.5, 149.6, 149.7; 137/614.03, 614.04, 614.05; 285/315, 316

[56] References Cited

U.S. PATENT DOCUMENTS

| | | | |
|---|---|---|---|
| 1,913,982 | 6/1933 | Fox | 251/149.6 |
| 2,135,222 | 11/1938 | Scheiwer | 137/614.04 |
| 2,265,267 | 12/1941 | Cowles | 251/149.6 |
| 2,283,970 | 5/1942 | Buttner | 251/149.4 |
| 2,463,326 | 3/1949 | Smisko et al. | 137/614.03 |
| 3,334,860 | 8/1967 | Bolton, Jr. | 251/149.1 |
| 3,684,321 | 8/1972 | Hundhausen | 285/316 |

FOREIGN PATENT DOCUMENTS 109,393 4/1964 Netherlands .................. 285/316

*Primary Examiner*—William R. Cline
*Attorney, Agent, or Firm*—Norman Lettvin

[57] ABSTRACT

A quick connection coupler for securement to a complementary nipple is produced principally of plastic parts by using molded slide-type cam jaws in a molded tubular body for gripping the nipple, and by using a molded downstream seal retainer telescoped into the coupler body for supporting a downstream packing that is to effect a seal with the downstream end of the nipple. The seal retainer preferably provides a valve thereon that operates automatically to close and prevent back flow through the coupler when the coupler is separated from the nipple, and to be opened for flow therepast upon connection of the coupler to the nipple.

8 Claims, 7 Drawing Figures

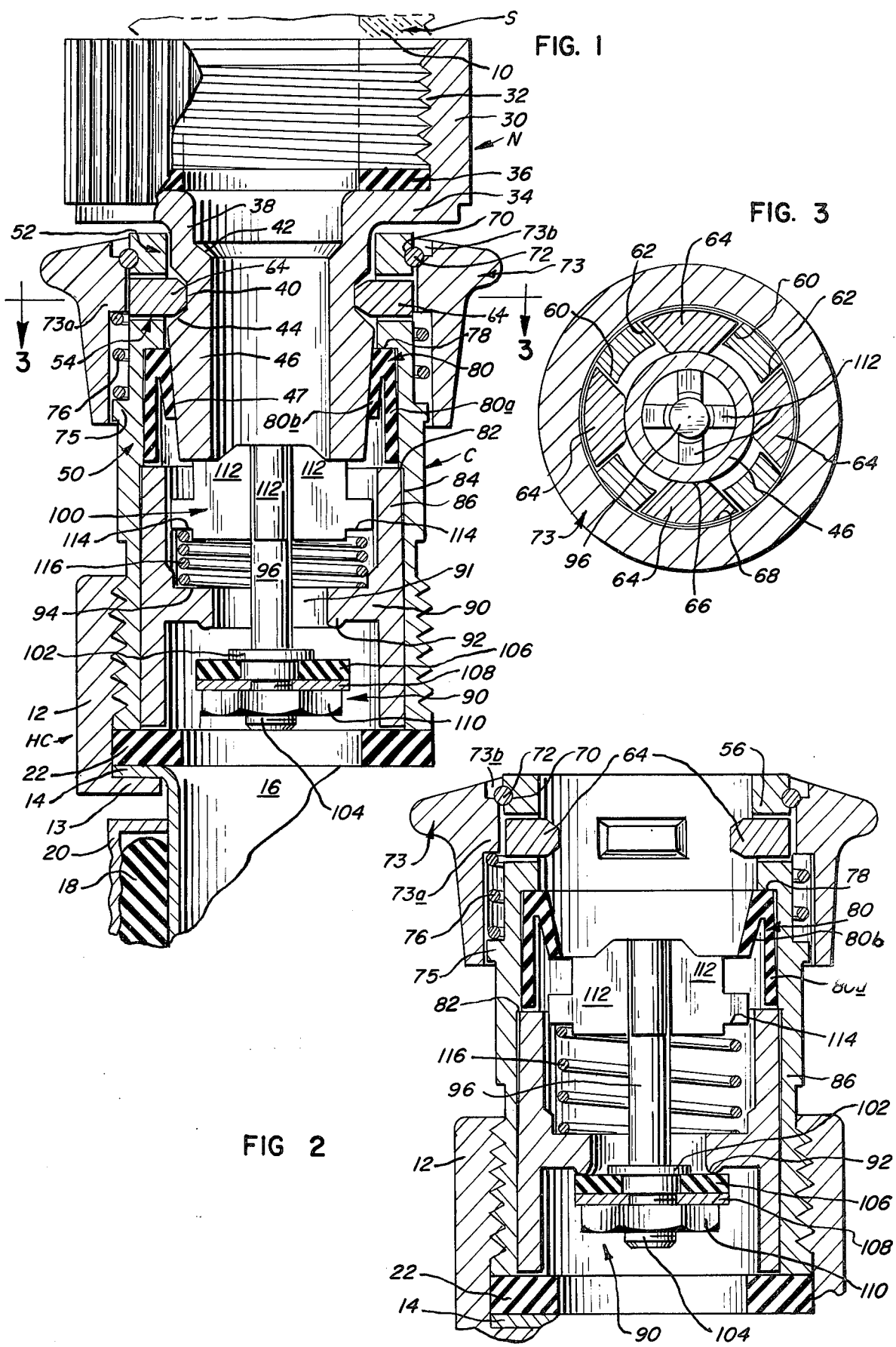

COUPLER WITH AUTOMATIC SHUT-OFF

FIELD OF THE INVENTION

This invention relates to a quick connection coupler, and more particularly relates to a molded coupler for effecting quick connection to a water supply, such as for a garden hose and the like, and for effecting automatic shutoff of back flow through the coupler when the coupler is detached from the source of liquid.

BACKGROUND OF THE INVENTION

Screw-type couplers for securing an end of a conduit, such as a garden hose, to a spigot are commonly known in and around almost every home. It is known to equip a source of water with an exterior annular groove designed to receive a quick connection coupler, so that screw-on of a standard coupling is not required each time a connection is made, to develop the sealing gasket pressure required to effect a proper seal between separable parts. Although such quick connection couplers are convenient to use, the cost of prior quick connection couplers, made of metal such as disclosed in U.S. Pat. No. 2,954,936 has heretofore served to limit their availability as a convenience.

Thus, one object of this invention is to provide a quick connection coupler that is constructed principally of plastic parts with simplified means for retention of the seal means therein, so as to provide a coupler that is characterized by both reliability and effectiveness of operation and by simplicity and inexpensiveness of construction.

Another object of this invention is to provide a quick connection coupler, for attachment to the inlet end of hoses and the like, that includes therein a combination seal retainer and an automatic shutoff valve that prevents undesirable back flow through the coupler when it has been disconnected from a supply nipple to which the coupler connects.

Further objects and advantages will become apparent from the following description of a preferred embodiment of the invention.

BRIEF SUMMARY OF THE INVENTION

A garden hose spigot, or other valved source of water, is equipped with a screw-on nipple adapter to first convert the source of liquid for use with a quick connection coupler. Both the nipple and quick connection coupler are constructed primarily of molded plastic parts to reduce costs. As a quick connection coupler is required to use cam actuatable interference parts for effecting securement, and seal means for preventing leakage through the coupler, in order to achieve a quick connection coupler construction that could be effectively and inexpensively produced in a plastic material, it was discovered that an effective design for the interference parts could be achieved by providing such parts as arcuate, wedge-shaped, slidable cam jaws, and that the seal means could be economically and reliably secured, without undercutting the interior of the coupler, by positioning and retaining the seal means in a tubular section of the coupler through use of a sleeve-like seal retainer that would telescope into the coupler body to be retained thereby. In a preferred embodiment, the seal retainer provides thereon a shut-off valve that automatically closes when the coupler is separated from the nipple part to which the adapter is to secure and which is automatically opened upon attachment of the coupler to said nipple part.

BRIEF DESCRIPTION OF THE DRAWINGS

FIG. 1 is a vertical cross-sectional view through the longitudinal axis of a preferred embodiment of a nipple and coupler connection that embodies the invention of this application;

FIG. 2 is a view similar to FIG. 1 but showing the coupler separated from the nipple, and with the automatic shutoff valve of the coupler in its closed position;

FIG. 3 is a cross-sectional view taken substantially on line 3—3 of FIG. 1 transversely of the longitudinal axis of the coupler and showing certain details of construction of the slidable interference members of the coupler;

DETAILED DESCRIPTION OF THE PREFERRED EMBODIMENT

Figure 5:
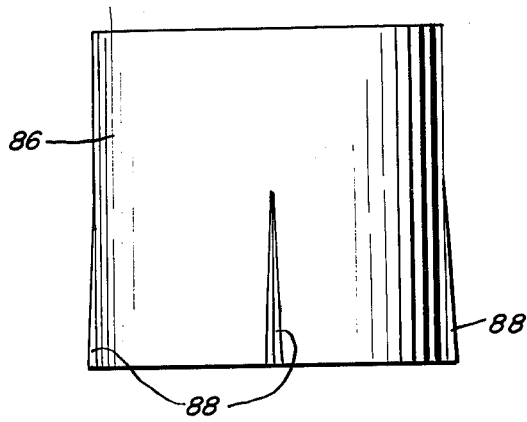
FIG. 5 is a side elevational view of the U-packing retainer that is to be telescoped into the lower tubular end of the body of FIG. 4, to effect retention of a U-packing in the coupler body.

Referring now to the drawings, the improved coupler of this invention is shown in a preferred environment, such as for use as a quick connection coupling device for conduits, such as garden hoses and the like. The upper end of FIG. 1 shows a downstream fragment of a threaded spout S of a valved spigot, such as is typically found on the exterior of homes. The fragment of spout S is a male-threaded tubular outlet 10, to which a female-threaded hose coupling, generally indicated at HC, would normally connect. The hose coupling HC, shown in fragment at the lower end of FIG. 1, includes a female-threaded coupling part 12, flanged at 13 for rotary cooperation with an out-turned abutment and retaining flange 14 of an elongated sleeve-like connector 16. A conduit, such as flexible hose end 18, is clamped onto sleeve connector 16, as is well known in the art, by a crimped clamping ferrule 20 that is spaced below flange 14 to provide an annular space for freely receiving the inturned flange 13 of female coupling part 12. The abutment and retaining flange 14 supports thereabove sealing washer 22 which is circumferentially confined within female coupling part 22.

In order to provide for the convenience of use of a quick connect coupling, there is provided a nipple N, which in the preferred form, is molded of plastic, preferably such as "Delrin", and which secures to the tubular outlet 10 of spout S. The nipple N has an attachment head 30 female-threaded with garden hose threads 32 for securement to the spout S. The nipple includes an inturned annular shoulder 34 which supports a seal washer 36 for engagement with the terminus spout outlet 10, and a downstream extending tubular nipple part. The exterior of the nipple part downstream of the attachment head 30 provides an upper section 38 of an outer diameter selected for proper fit into the coupler and a circumferential groove section 40 that is adapted to receive interference members carried by the coupler for purposes of effecting the connection between the coupler and the nipple. The circumferential groove 40 is bounded by oppositely-inclined, upper and lower, frusto-conical annular shoulder surfaces, respectively at 42 and 44, as is well known in the art. The portion of the nipple downstream of surface 44 is in the form of an elongated frusto-conical tail piece 46 that tapers in a downstream direction to provide an elongated tapered sealing surface 47 thereon.

Turning now to the coupler itself, the quick connect coupler is generally indicated at C and includes a male-threaded downstream portion for securement of coupler C to the female-threaded coupling part 12 of the hose coupling HC. Thus, with the nipple N secured to spout outlet 10 and coupler C secured to coupling part 12, the separable parts have been changed from an inconvenient screw-on connection between coupling part 12 and spout outlet 10 to a convenient quick connection between coupler C and nipple N.

Figure 4:
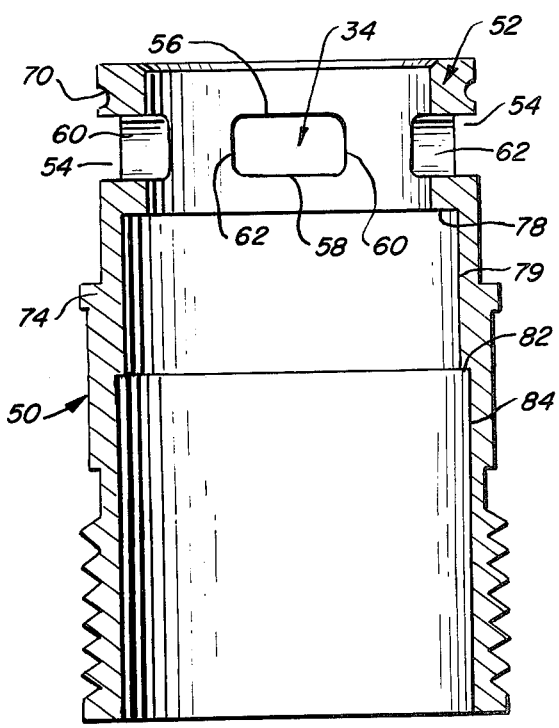
FIG. 4 is a vertical, axial cross-sectional view of the body of the coupler shown in FIGS. 1-3.

In the specific construction of the quick connecting coupler C there is included an elongated tubular body 50, as best seen in FIG. 4, having upstream and downstream ends, the upstream end being arranged, as best seen in FIG. 1, to telescopically receive thereinto the grooved nipple end to which coupling is to be effected. The body 50 is a molded plastic part that provides thereon adjacent the upstream end, an annular section 52 that is apertured transversely of the body's longitudinal axis to provide upstream attachment means adapted for securement to the nipple. More specifically, there are provided four equally spaced, circumferentially elongated, slot-like apertures 54 each with parallel top and bottom walls 56 and 58 and two end walls 60 and 62, the two end walls 6 and 62 lying in axial planes that are substantially at right angles to each other, as can be clearly seen in FIG. 3. Four molded interference members 64 are slidably arranged, one in each of said slots, the interference member having upper and lower parallel sides, and lateral ends that are arranged in planes that are at right angles to each other. The shape of each of the four interference members is generally that of a segment of an annulus. As best seen in FIG. 1, the innermost portion of each member 64 is reduced and shaped to conform to the tapered shape of groove 40 bounded by surfaces 42 and 44. The inner and outer edges of the interference members 64 are arcuate, as clearly seen in FIG. 3, with the inner arcuate edge 66 being of substantially the same radius of curvature as the innermost wall of groove 40 on the nipple, and with the outer arcuate wall 68 being of substantially the same radius of curvature as the inner wall of a sleeve actuator that surrounds body 50, and which operates to cam the interference members 64 inwardly to their nipple-gripping position shown in FIG. 1.

The body 50 is provided with a circumferential groove 70 located in a plane transverse to the longitudinal axis of body 50 and spaced above the transverse plane through apertures 54. The groove 70 is adapted to receive a metal snap ring retainer 72 which also serves as an upper abutment to be engaged by a portion of a sleeve-like actuator 73, that surrounds body 50, to limit upstream axial movement of said actuator 73. Spaced below the plane through apertures 54, and on the exterior of body 50, is an outwardly extending annular shoulder 75 that supports the lower end of a compression coil spring 76. Spring 76 is confined in an axially elongated annular recess, defined circumferentially between spaced concentric portions of sleeve-like actuator 73 and body 50 and defined axially between shoulder 75 on body 50 and inwardly extending camming flange 73a on actuator 73. The camming flange 73a, when in the position of FIG. 1, operates to thrust interference members 64 radially inwardly to a nipple gripping position, but when actuator 73 is selectively retracted downstream to compress spring 76, the recess 73b at the upper end of actuator is moved into alignment with members 64 which then are free to retract radially outwardly to a position which releases the nipple N.

The downstream end of body 50 is an open sleeve to permit slidable insertion thereinto of a seal means for cooperation with the nipple N, and of a retainer for holding the seal means in position without having to form or undercut a seal-holding recess in the body 50. For this purpose the body 50 provides two axially spaced annular abutments, the first being an upstream annular abutment wall 78 against which the bight of a pre-formed U-shaped packing 80 is thrust, and the second being an annular shoulder 82 formed in the inner wall of body 50 and spaced axially downstream of wall 78. The U-packing 80 has an outer cylindrical wall 80a for lying against the inner periphery of the downstream sleeve of body 50 and an inner generally frusto-conical wall 80b for sealing engaging the tapered outer wall of the nipple N. The axial spacing between annular walls 78 and 82 is slightly, about 0.010 to 0.015 inches, greater than the axial length of wall 80a of the U-packing.

Figure 6:
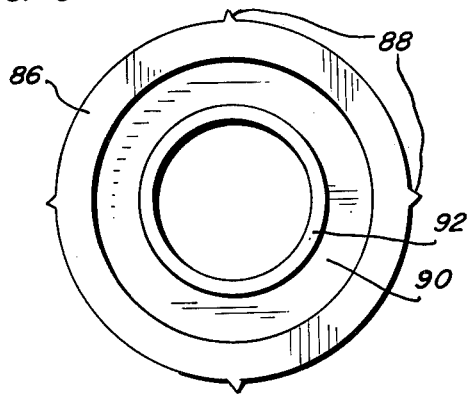
FIG. 6 is a bottom plan view of FIG. 5.
Figure 7:
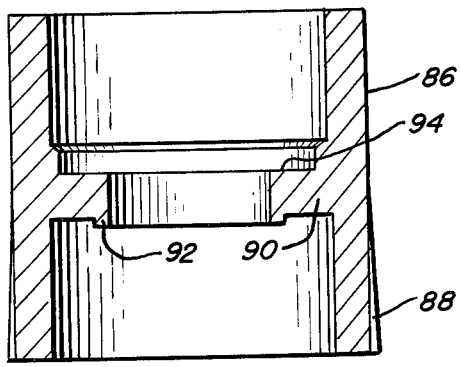
FIG. 7 is a vertical, axial cross-sectional view of the packing retainer shown in FIGS. 5 and 6.

The inner wall 84 of downstream sleeve of body 50 that extends downstream of shoulder 82 is only generally cylindrical, and is really slightly frusto-conical because draft requirements of molds for molded parts cause the I.D. of wall 84 adjacent shoulder 82 to be smaller than the I.D. of wall 84 adjacent the downstream terminus of body 50. A retainer is provided for preventing U-packing 80 from being dislocated within body 50. The retainer, illustrated in assembly in FIGS. 1 and 2, and as a separate part prior to assembly, seen in FIGS. 5–7, includes an elongated sleeve 86 whose outer wall is slightly frusto-conical, with a plurality of tapered flutes 88 provided on the periphery of the lower section of the sleeve and circumferentially spaced thereon. In preferred form there are four flutes 88 arranged in two axial planes perpendicular to each other. The O.D. of the upper end of sleeve 86 is of dimension greater than the I.D. of shoulder 82 and less than the I.D. of the portion of wall 84 adjacent shoulder 82, so that sleeve 86 may be slidably inserted, but insertion is limited by abutment with shoulder 82. The wall thickness of sleeve 82 is selected to provide that the upper end of sleeve 86 will serve to engage the leg 80a of the U-packing. The O.D. of the lower end of sleeve 86 is less than the I.D. of wall 84 at its downstream end, but the size of flutes 88 is such that the greatest O.D. that circumscribes the flutes is greater than the I.D. of the wall 84 at its downstream end, and therefore, insertion of sleeve 86 into body 50 requires a force fit of the flutes 88 into the body 50. When sleeve 86 is fully inserted into body 50, the end of body 50 extends downstream of the downstream end of sleeve 86, so that body 50 seals against seal washer 22. The use of tapered flutes 88 as the means for effecting a force fit between sleeve 86 and body 50 limits the stresses developed, thereby providing for effective assembly and retention without rupture of the parts that are forced together.

In preferred construction on automatic shutoff valve is provided in coupler C. The elongated sleeve 86 is of molded construction and is provided with an internal transverse annular wall 90 upon which is defined a raised valve seal 92 facing downstream and surrounding a central flow aperture 91, and an upstream spring abutment surface 94. An elongated valve stem 96 extends through flow aperture 91 and carries a valve 90 at its downstream end and a controller 100 at its upstream end. Stem 96 includes abutment shoulder 102, a threaded portion 104, a sealing washer 106 of a size for engagement with valve seat 92, a back-up rigidifying washer 108, and a nut 110 screw threaded onto threaded portion 104 for assembly clamping of washers 108 and 106 against shoulder 102. Controller 100 includes four radially extending, and circumferentially spaced, ribs 112 shaped and spaced to provide a centering abutment 114 for seatingly receiving upper end of coil spring 116 that is held compressed between ribs 112 and spring abutment surface 94. The upper ends of ribs 112 are shaped for centering cooperation and engagement with the downstream terminus of nipple N, so that when coupler C is connected to nipple N, as seen in FIG. 1, the controller 100 engages nipple N and is depressed against the bias of spring 116 to a valve-open position, but when coupler C is disconnected from nipple N, as seen in FIG. 2, the spring 116 biases the valve 90 to a valve-closed position. The back pressure of liquid in hose 18 also operates to bias valve 98 toward valve-closed position.

While there has been disclosed one form of the invention, it will be understood that the invention may be utilized in other forms and other environments, so that the purpose of the appended claims is to cover all such forms of devices not disclosed but which embody the invention disclosed herein.

What is claimed is:

1. In a coupler that includes: elongated tubular body means having upstream and downstream ends, the upstream end being arranged to telescopically receive thereinto an exteriorly grooved nipple to which coupling is to be effected; and a plurality of radially movable, arcuately shaped, interference members carried by said body means, each interference member having arcuate inner and outer edges and being movable radially between an outer, inoperative position, and an inner position where a portion of said interference members enter the nipple's groove to hold the nipple within the body means by interfering with withdrawal of the nipple from the tubular body means; and means for selectively moving the interference members between said outer and inner positions; the improvement comprising, in combination:

the elongated tubular body means being an elongated, unitary, tubular body part of molded plastic constructed to provide thereon an upstream annular section that is apertured transversely of the body's longitudinal axis to provide upstream attachment means adapted for effecting securement with said nipple, the upstream attachment means including a plurality of holes each of generally rectangular cross-section extending through the wall of the tubular body part to provide in the tubular body part a pair of end walls, located in planes that are substantially at right angles to each other, and a pair or parallel top and bottom walls spaced apart a fixed amount axially of said elongated tubular body;

the interference members each being constructed and arranged for substantially only radial slide-type movement in the space defined between the parallel walls of an associated one of said holes extending through said tubular body part, said interference members each being an arcuately, elongated molded plastic part provided with arcuate inner and outer edges and upper and lower parallel sides, and with ends transverse to said arcuate edges and parallel sides and located in planes that are substantially at right angles to each other; and an actuator sleeve surrounding the tubular body part and being freely slidably movable, axially in opposite directions relative to said body part, the sleeve having a cam means defined interiorly thereof and positioned to normally maintain the interference members in their inner position, the sleeve being selectively manually slidable to a second sleeve position, at which the interference members may move to their outer inoperative position.

2. An improved coupler as in claim 1 wherein the interior of the tubular body part, downstream of said attachment means, defines a pair of axially spaced, annular abutments that are integral with said tubular body part and project radially inwardly from the wall of said body part, the upstream one of said pair of annular abutments projecting radially inwardly to a greater extent than does the downstream one of said abutments;

an annular, flexible, U-packing seal means received into the tubular body part through the downstream end of said body part, said seal means being of an axial length and so positioned within said body part that one leg of the U circumferentially engages the interior wall of said body part located axially between said pair of spaced abutments, the upstream abutment limiting upstream movement of said seal means relative to said body part, and the other leg of the U-packing seal means providing for seal against a nipple to which the coupler is to connect;

and a molded, axially elongated, tubular retainer for said seal means telescoped into, and frictionally retained by engagement with, a portion of the said body part located downstream of said pair of annular abutments, the upstream end of the retainer engaging the downstream one of said abutments, and the wall thickness of the tubular retainer being such as to locate the inner upstream edge of said retainer inwardly of the wall of the body part against which said seal means engages, thereby to limit movement of said seal means downstream of said downstream annular abutment.

3. In a coupler that includes: elongated tubular body means having upstream and downstream ends, the upstream end being arranged to telescopically receive thereinto an exteriorly grooved nipple to which coupling is to be effected; and a plurality of radially movable, arcuately shaped, interference members carried by said body means, each interference member having arcuate inner and outer edges and being movable radially between an outer, inoperative position, and an inner position where a portion of said interference members enter the nipple's groove to hold the nipple within the body means by interfering with withdrawal of the nipple from the tubular body means; and means for selectively moving the interference members between said outer and inner positions; the improvement comprising, in combination:

the elongated tubular body means being an elongated, unitary, tubular body part of molded plastic constructed to provide thereon, adjacent its upstream end, an upstream annular section that is apertured transversely of the body's longitudinal axis to provide upstream attachment means adapted for effecting securement with said nipple, the upstream attachment means including a plurality of circumferentially elongated, slot-like holes extending through and completely surrounded by the wall of the tubular body part;

the interference members each being constructed and arranged for substantially only radial slide-type movement in the associated one of said slot-like holes extending through said tubular body part, said interference members each being an arcuately elongated molded plastic part provided with arcuate inner and outer edges;

an actuator sleeve surrounding the tubular body part and being freely slidably movable, axially in opposite directions relative to said body part, the sleeve having a cam means defined interiorly thereof and positioned to normally maintain the interference members in their inner position, the sleeve being selectively manually slidable to a second sleeve position, at which the interference members may move to their outer inoperative position;

the interior of the elongated, unitary tubular molded plastic body part, that is downstream of said upstream attachment means, being provided with a pair of axially spaced, annular abutments that define upstream and downstream ends of an internal elongated sealing sleeve;

an annular, flexible, seal means of U-shaped cross-section positioned within said plastic body part with the bight of the U of the seal means engaging the upstream abutment and with the outer leg of the U-shape engaging the internal elongated sealing sleeve; and a molded, axially elongated, tubular retainer for the seal means telescoped into, and frictionally retained by engagement with, a portion of the said tubular body part located downstream of said internal elongated sealing sleeve, the upstream end of said tubular retainer being of selected diameter and wall thickness to engage the downstream one of said pair of annular abutments and to extend radially inwardly of said one abutment to a position to prevent movement of the seal means downstream of said elongated sealing sleeve.

4. An improved coupler as set forth in claim 3 wherein said tubular retainer carries sub-assembled thereon a valve means that is spring biased normally toward a closed-valve condition, an actuator on said valve means projecting in an upstream direction within the tubular body part to a position located radially inwardly of the seal means and in position so as to be engaged and moved downstream by the nipple to which the coupler is to connect, so as to effect automatic opening of said valve means when the coupler is connected to a nipple, with the valve means being automatically closed upon the coupler being separated from said nipple.

5. A coupler as in claim 3 wherein the axial spacing between said downstream annular abutment and the downstream terminus of said tubular body part is at least as great as the axial length of the tubular retainer.

6. A coupler as in claim 3 wherein the molded tubular retainer is integrally provided with a plurality of axially elongated flutes spaced circumferentially about the exterior of said retainer and tapered to increase in size to a maximum at the downstream end of said retainer, the tapered flutes permitting telescopic insertion and retention of the molded tubular retainer within the molded plastic body part without rupture of the parts as they are forced together.

7. A coupler as set forth in claim 3 wherein the exterior of the downstream end of said molded body part is provided with attachment means molded thereon adapted for operative attachment to a hose coupling; the length of the tubular molded body part downstream of said upstream apertured annular section being greater than the combined axial length of the U-packing and the tubular support for the U-packing, and the entire length of said tubular support being telescoped into the downstream portion of the tubular body, leaving the downstream terminus of the tubular body exposed and adapted to seal with a hose coupling that may be secured to said downstream attachment means of the tubular body part.

8. A coupler as in claim 3 wherein the tubular retainer has an annular valve support thereon with a downstream facing valve seat, a valve positioned downstream of said valve seat for movement in an upstream direction, with back pressure after the coupler is disconnected from a nipple to close against said valve seat, a valve actuator connected to the valve and extending through the central aperture of the annular valve support to a position upstream of the annular valve support, spring means carried on the upstream side of said annular valve support and arranged to bias the valve actuator upstream toward the valve seating position, and the valve actuator being positioned to be engaged and moved away from its valve seating position by the downstream end of the nipple when the coupler is attached to said nipple.

* * * * *